United States Patent [19]

Huffman

[11] Patent Number: 4,874,539

[45] Date of Patent: Oct. 17, 1989

[54] CARBOXY HYDROXAMIC ACID POLYMERS AND THEIR USE AS DETERGENT ADDITIVES

[75] Inventor: K. Robert Huffman, Stamford, Conn.

[73] Assignee: American Cyanamid Company, Stamford, Conn.

[21] Appl. No.: 82,263

[22] Filed: Aug. 6, 1987

[51] Int. Cl.$^4$ ............................ C11D 3/20; C11D 3/37
[52] U.S. Cl. ............................... 252/174.24; 252/132; 252/180; 252/DIG. 2; 252/DIG. 11; 525/327.6; 525/321.7; 526/271; 526/307.6; 526/311; 526/933
[58] Field of Search ................... 252/132, 174.24, 180, 252/DIG. 2, DIG. 11; 525/327.6, 329.7; 526/271, 307.6, 311, 933

[56] References Cited

U.S. PATENT DOCUMENTS

| | | | |
|---|---|---|---|
| 2,402,604 | 6/1946 | Coffman | 525/327.6 |
| 4,040,988 | 8/1977 | Benson et al. | 252/532 |
| 4,432,884 | 2/1984 | Kawasaki et al. | 252/180 |

OTHER PUBLICATIONS

Solmons, *Organic Chemistry*, 3rd Ed., NY, Wiley, 1984, pp. 792–793.

Fife et al., "Phase-Managed Organic Synthesis. 2. A New Polymer-Assisted Synthesis of Acid Anhydrides", Tetrahedron Lett. 1986, 27(41), 4933–4936.

*Primary Examiner*—Robert A. Wax
*Attorney, Agent, or Firm*—Steven H. Flynn

[57] ABSTRACT

Polymeric carboxy hydroxamic acids useful as detergent additives are disclosed which are advantageously prepared from polyacrylic acid by first dehydrating the polyacrylic acid to form polyacrylic anhydride followed by reaction with a hydroxylamine compound.

9 Claims, No Drawings

CARBOXY HYDROXAMIC ACID POLYMERS AND THEIR USE AS DETERGENT ADDITIVES

The present invention relates to carboxy and hydroxamic acid-functional polymers useful as adjuvants for detergents and to detergent compositions, particularly fabric washing detergent compositions containing such polymers. In particular it relates to polymeric carboxy hydroxamic acids and to detergent compositions comprising at least one detersive surfactant and an effective amount of a carboxy hydroxamic acid polymer.

BACKGROUND OF THE INVENTION

Detergent compositions have long employed materials, known as "builders", to improve the detergency of soaps and synthetic detergents by actively chelating alkali metal cations which are normal components of "hard" tap water. Such builders have been found to affect, for instance, soil suspension, emulsification of soil particles, solubilization of waterinsolubles, and inactivation of various mineral constitutents present in a detergent system. Many materials useful as builders have been proposed, and their effects are known. See, e.g., U.S. Pat. Nos. 3,852,213, 3,950,260, 4,182,718, and 4,440,646 (all incorporated herein by reference).

Recently, however, the attention of detergent manufacturers and researchers has turned to the role of heavier metal cations, i.e., transition metal cations and particularly iron, in the formation of stain complexes on fabrics and other surfaces. It has been observed that these multivalent transition metal cations, particularly iron ($Fe^{+++}$), enhance the binding of the components of many stains to substrates, and breaking up the cation-enhanced bonds is an effective approach to stain removal. Therefore, there is a strong need for the discovery of new materials that are effective as chelating agents for transition metal cations, are easy to prepare, and can be added to detergent compositions in economical amounts to boost stain-removing power.

It has now been discovered that carboxylic acid and hydroxamic acid-functional polymers can be easily and advantageously prepared from polyacrylic acid and that such polymers are active transition metal ion chelating agents, particularly with respect to iron ($Fe^{+++}$), which makes these polymers extremely useful as stain removing agents that can be included in detergent compositions. The polymeric carboxy hydroxamic acids are most advantageously prepared by a process utilizing polyacrylic acid which is dehydrated to produce polyacrylic anhydride in a manner that is more efficient than previously known methods. The polyacrylic anhydride is then reacted with a hydroxylamine compound to produce the novel polymeric carboxy hydroxamic acids. The bi-functional nature of the polymeric product and the variability in the relative positions of the functional acid groups along the hydrocarbon chain make the polymeric carboxy hydroxamic acids especially effective as detergent additives or for any application where chelation of transition metal ions is desired.

SUMMARY OF THE INVENTION

It is therefore an object of the present invention to provide a new class of metal ion chelating agents.

It is a further object of the present invention to provide a detergent additive which is active in stain removal.

It is a further object of the present invention to provide a novel detergent composition.

It is a further object of the present invention to provide a fabric-washing detergent composition that is effective in stain removal.

It is a further object of the present invention to provide a novel method for efficiently preparing polyacrylic anhydride.

These and other objects are achieved, according to the present invention, by copolymers having repeating units of the formula

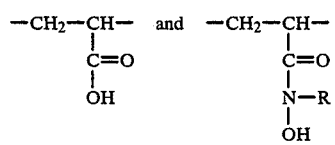

wherein R represents hydrogen or lower ($C_1$–$C_6$) alkyl, cycloalkyl or phenyl.

Also contemplated herein are detergent compositions comprising one or more detersive surfactants and one or more detergent additives consisting of polymeric carboxy hydroxamic acids having repeating units of the formula

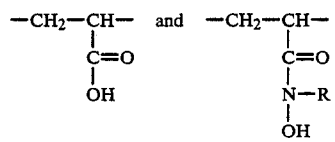

wherein R represents hydrogen or lower ($C_1$–$C_6$) alkyl, cycloalkyl or phenyl.

Also contemplated herein is a novel method for the production of polyacrylic anhydride comprising reacting polyacrylic acid with an acyl halide of the formula R'C:OX, wherein R' represents an organic radical of 1 to 12 carbon atoms selected from straight or branched chain alkyl, aryl, alkaryl, aralkyl, or alkenyl radicals, and X represents a halogen atom or an organic anhydride residue having the formula R'C:OO—, where R' has the same definition as above.

It is also an object of the present invention to provide a process for preparing polymeric carboxy hydroxamic acids comprising (a) reacting polyacrylic acid with an acyl halide compound of the formula R'C:OX, wherein R' represents an organic radical of 1 to 12 carbon atoms selected from straight or branched chain alkyl, aryl, alkaryl, aralkyl, or alkenyl radicals and X represents a halogen atom or an organic anhydride residue of the formula R'C:OO—, where R' is as defined above, and (b) reacting the resultant polymeric anhydride with a hydroxylamine compound of the formula HRNOH, wherein R represents hydrogen or lower ($C_1$–$C_6$) alkyl, cycloalkyl or phenyl. The polymers obtained by this process are also contemplated herein.

DETAILED DESCRIPTION OF THE INVENTION

The polymeric carboxy hydroxamic acid detergent additives of the present invention are advantageously prepared from polymers of acrylic acid, $CH_2$=$CHCOOH$, by first dehydrating the polymer by contacting it with an acyl halide to obtain a polyacrylic anhydride, then reacting the polymeric anhydride with a hydroxylamine compound to obtain the bifunctional polymers of the present invention. These carboxylic and hydroxamic acid-functional polymers are water-soluble and exhibit good transition metal ion chelating properties.

During the reaction between the polyacrylic anhydride and the hydroxylamine compound, ring-opening reactions occur along the polymeric chain, adding carboxylic acid and hydroxamic acid functions to the polymer. Thus, a typical reaction scheme for the preparation of detergent additives according to the present invention is as follows:

R'C:OO—, where R' has the same definition as above. Suitable acyl compounds useful in this reaction include, e.g., ethanoyl chloride, propanoyl chloride, butanoyl chloride, 2-methyl propanoyl chloride, benzoyl chloride, the bromide and fluoride acid halides corresponding to such compounds, ethanoic anhydride, propanoic anhydride, benzoic anhydride, phthalic anhydride, and the like.

Typically, polyacrylic acid is contacted directly with the acyl compound. The polyacrylic acid, which is normally obtained in aqueous solution, is dried, e.g., by freeze-drying, to give a solid. The solid can be mixed directly with the acyl compound, or the polyacrylic

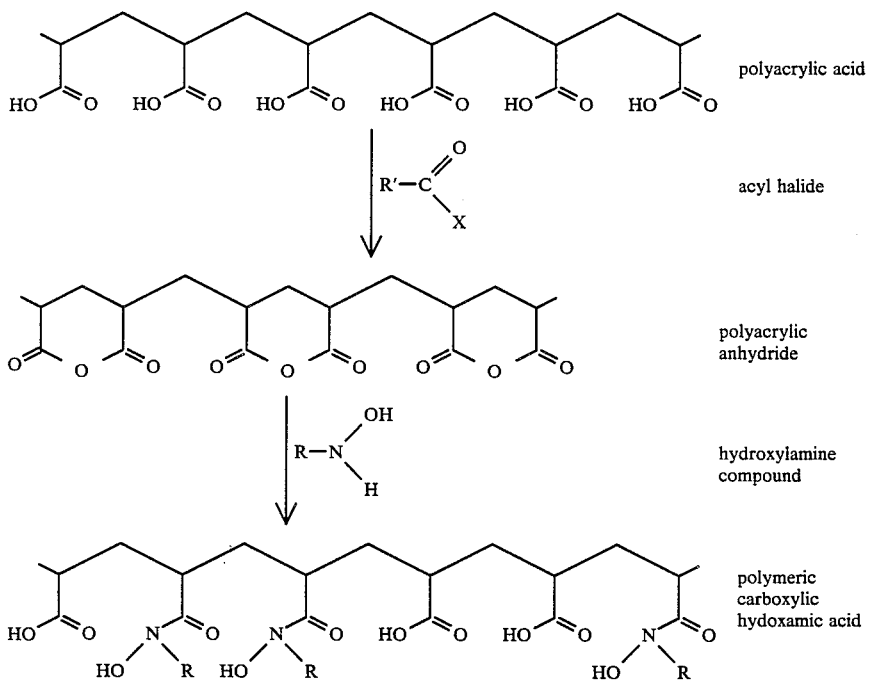

Polyacrylic acid is prepared by the addition polymerization of acrylic acid. This material is commercially available in several grades from a number of sources, e.g., Polysciences, Inc., (Warrington, PA). The molecular weight of the polymer used can vary across a wide range, depending on the desires of the practitioner, e.g., from about 500 to 15,000 or more.

Polyacrylic anhydride can be made from polyacrylic acid in known ways, for example by reaction with hexaclorotriazatriphosphorine ($N_3P_3Cl_6$). See Di Gregorio et al, *J. Org. Chem.*, 46, 4569–70 (1981), incorporated herein by reference. Polyacrylic anhydride is a valuable intermediate but has not been extensively used heretofore because it has been obtainable only by polymerization of expensive acrylic anhydride monomer or by cyclization of polyacrylic acid using reagents, such as $N_3P_3Cl_6$, that are difficult and expensive to obtain. Now, however, a simple 1-step method for dehydrating polyacrylic acid has been discovered which permits ready production of polyacrylic anhydride at yields exceeding 90%.

In accordance with the present invention, polyacrylic acid is reacted with an acyl compound having the general formula R'C:OX, wherein R' is an organic radical having 1 to 12 carbon atoms and can be alkyl, aryl, arylalkyl, alkaryl, alkenyl, and X is a halogen atom or an organic anhydride residue having the formula acid and the acyl compound can be reacted in a suitable non-polar solvent, such as diethyl ether. Preferably a large excess of acyl compound will be used, e.g., 2 to 10 moles per mole of polyacrylic acid, in order to ensure complete cyclization and minimize the amount of residual carboxyl groups.

The polyacrylic anhydride prepared according to the present invention is insoluble in $CHCl_3$, $CH_2C_2$ and $CH_3CN$ but is soluble in dimethylformamide (DMF) and dimethylsulphoxide (DMSO). The solubility in the latter polar solvents indicates absence of significant cross-linking.

Reaction of the polyacrylic anhydride polymer to obtain polymeric carboxy hydroxamic acids may be accomplished by contacting the anhydride polymer with a hydroxylamine compound of the formula HRNOH or a salt thereof, where R is hydrogen, or a lower ($C_1$–$C_6$) alkyl, cycloalkyl or phenyl radical. Preferably, the amount of hydroxylamine compound employed will be effective to completely react with the anhydride in a ring-opening reaction to leave substantially no anhydride moieties remaining. Most preferably, about 1 to 3 moles of hydroxylamine compound or salt thereof per mole of polyacrylic anhydride will be used. Hydroxylamine hydrochloride is most preferred. The reaction will normally be carried out in the presence of about 0.2–5.0 moles per mole of hydroxylamine compound of a basic agent, preferably an organic base such as sodium acetate, sodium ethoxide, pyridine, triethylamine or quinoline.

The product may be isolated in any one of a number of known ways. For example, the product can be isolated by precipitation from a non-solvent, such as absolute ethanol, and the precipitate filtered, washed and dried under vacuum to give the final polymer.

Alternatively, flash or spray drying may be used. The drying step removes substantially all of the organic base, and washing with alcoholic hydrogen chloride effectively scavenges residual amounts, in cases where complete removal of the basic agent is required.

The polymeric carboxy hydroxamic acids are quite strongly acidic. They are generally insoluble in common organic solvents such as methylene chloride, chloroform, and acetonitrile. In water, the carboxylic hydroxamic acid polymers prepared according to the invention have been found to be soluble over a wide range of pH.

The carboxylic and hydroxamic acid polymers are active stain removers are advantageously included in a detergent composition, in accordance with the present invention. A detergent composition of this invention will contain at least one detersive surfactant. Such surfactants will be present in amounts usually encountered in detergent compositions, e.g., from about 1% to about 50% by weight, preferably about 5% to about 25% by weight for fabric-washing detergents, and most preferably from about 10% to about 20% by weight based on the total weight of the detergent composition. The surfactants may be anionic, nonionic, cationic or amphoteric, and mixtures of different detersive surfactants may be used. Non-limiting examples of suitable detersive surfactants include:

(a) Anionic surfactants: soaps, i.e., alkali metal (preferably sodium or potassium) salts of long-chain fatty acids containing from 8 to 20 carbon atoms, such as lauric, myristic, oleic, palmitic, capric, caprylic, and stearic acids, used singly or in mixtures of differing chain lengths; alkali metal salts of organic sulphuric reaction products having long hydrocarbon chains of about 8 to about 20 carbon atoms and a radical selected from the group consisting of sulphonic acid and sulfuric acid ester radicals, such as sodium or potassium alkyl sulphates, preferably those obtained by sulphating higher ($C_8$–$C_{18}$) alcohols; sodium or potassium alkyl benzene-sulphonates in which the alkyl group contains from about 9 to about 20 carbon atoms, such as sodium linear alkyl ($C_{10}$–$C_{15}$) secondary benzenesulphonate, 2-phenyl-dodecanesulphonate, 2-phenyl-octadecanesulphonate and 3-phenyl-dodecanesulphonate; alkali metal (preferably sodium) olefin sulphonates, i.e., the mixture of detersive surfactants obtained from sulphonation of $C_8$–$C_{22}$ olefins, preferably straight-chain alpha-olefins; sodium alkyl glyceryl ether sulphonates, including ethers of higher alcohols derived from tallow coconut oil and synthetic alcohols derived from petroleum; sodium coconut oil fatty acid monoglyceride sulphates and sulphonates; sodium or potassium salts of sulfur acid esters of the reaction between higher fatty alcohols (e.g., tallow or coconut oil alcohols) and ethylene oxide; the esterification products of fatty acids with isethionic acid, neutralized with sodium hydroxide; and sodium or potassium salts of fatty acid amides of methyl taurine.

(b) Nonionic synthetic detersive surfactants: compounds formed by condensing ethylene oxide with a hydrophobic base formed by the condensation of propylene oxide with propylene glycol; the polyethylene oxide condensates of alkyl-phenols, e.g., the condensation products of alkylphenols, having an alkyl group containing from about 6 to 12 carbon atoms in either a straight or branched chain, with ethylene oxide, said ethylene oxide being present in amounts equal to 5 to 25 moles of ethylene oxide per mole of alkylphenols (the alkyl substituent in such compounds may be derived from polymerised propylene, diisobutylene, octene dodecene, or nonene, for example); compounds derived from the condensation of ethylene oxide with the product resulting from the reaction of propylene oxide and ethylenediamine, such as compounds containing from about 40% to about 80% polyoxyethylene by weight and having a molecular weight of from about 5,000 to about 11,000 resulting from the reaction of ethylene oxide groups with a hydrophobic base constituted of the reaction product of ethylenediamine and excess propylene oxide, said hydrophobic base having a molecular weight of the order of 2,500 to 3,000; the condensation product of aliphatic alcohols having from 8 to 18 carbon atoms, in either straight chain or branched chain configuration, with ethylene oxide, e.g., a coconut alcohol-ethylene oxide condensate having from 6 to 30 moles of ethylene oxide per mole of coconut alcohol, the coconut alcohol fraction having from 10 to 14 carbon atoms; long chain tertiary amine oxides corresponding to the following general formula, $R^1R^2R^3N=O$, wherein $R^1$ is an alkyl radical of from about 8 to 18 carbon atoms and $R^2$ and $R^3$ are each methyl, ethyl or hydroxyethyl radicals, such as dimethyldodecylamine oxide, dimethyloctylamine oxide, dimethyldecylamine oxide, diethyltetradecylamine oxide and dimethylhexadecylamine oxide, N-bis (hydroxyethyl)dodecylamine oxide; long chain tertiary phosphine oxides corresponding to the following formula $R^4R^5R^6=O$, wherein $R^4$ is an alkyl, alkenyl or monohydroxyalkyl radical of 10 to 18 carbon atoms and $R^5$ and $R^6$ are each alkyl or monohydroxyalkyl groups containing from 1 to 3 carbon atoms, such as dimethyldodecylphosphine oxide, dimethyltetradecylphosphine oxide, ethylmethyltetradecylphosphine oxide, cetyldimethylphosphine oxide, dimethylstearylphosphine oxide, cetylethylpropylphosphine oxide, diethyldodecylphosphine oxide, diethyltetradecylphosphine oxide, bis(hydroxymethyl)dodecylphosphine oxide, bis(2-hydroxyethyl)dodecylphosphine oxide, 2-hydroxypropylmethyltetradecylphosphine oxide, dimethyloleylphosphine oxide, and dimethyl-2-hydroxydodecylphosphine oxide; and dialkyl sulphoxides corresponding to the following formula, $R^7R^8S=O$, wherein $R^7$ is an alkyl, alkenyl, beta or gamma-monohydroxyalkyl radical or an alkyl or beta or gamma-monohydroxyoxyalkyl radical containing one or two other oxygen atoms in the chain, the $R^7$ groups ranging from 10 to 18 carbon atoms in chain length, and wherein $R^8$ is methyl, ethyl or alkylol, such as dodecyl methyl sulphoxide, tetradecyl methyl sulphoxide, 3-hydroxytridecyl methyl sulphoxide, 2-hydroxydodecyl methyl sulphoxide, 3-hydroxy-4-decyloxybutyl methyl sulphoxide, 3-hydroxy-4-dodecyloxybutyl methyl sulphoxide, 2-hydroxy-3-decyloxypropyl methyl sulphoxide, 2-hydroxy-3-dodecyloxypropyl methyl sulphoxide, dodecyl ethyl sulphoxide, 2-hydroxydodecyl ethyl sulphoxide, dodecyl-2-hydroxy ethyl sulphoxide.

(c) Ampholytic synthetic surfactants: derivatives of aliphatic secondary and tertiary amines, in which the aliphatic radical may be straight chain or branched chain and wherein one of the aliphatic substituents contains from about 8 to 18 carbon atoms and one contains an anionic water solubilizing group, such as sodium-3-dodecylaminopropionate, sodium-3-dodecylaminopropanesulphonate and sodium N-2-hydroxydodecyl-N-methyl-taurate.

(d) Zwitterionic synthetic surfactants: derivatives of aliphatic quaternary ammonium compounds, sulphonium compounds and phosphonium compounds in which the aliphatic radical may be straight or branched chain and wherein one of the aliphatic substituents contains from about 8 to 18 carbon atoms and one contains an anionic water solubilizing group, such as 3-(N,N-dimethyl-N-hexadecylammonio)propane-1-sulphonate, 3-(N,N-dimethyl-N-hexadecylammonio)-2-hydroxypropane-1-sulphonate 3-(dodecylmethylsulphonium) propane sulphonate, and 3-(cetylmethylphosphonium) ethane sulphonate.

The detergent compositions of the present invention will contain, besides one or more detersive surfactants, about 3% to about 12% by weight of the composition, preferably about 6% by weight, of the polymeric carboxy hydroxamic acid detergent additives described above.

In addition to the surfactants and the carboxy hydroxamic acid detergent additives, the detergent composition may also contain conventional detergent builders such as condensed phosphates, trisodium nitrilotriacetate (NTA), sodium carbonate, zeolites, sodium silicates, etc., and organic polymers such as polyacrylates, polymaleates and polymethacrylates. See, e.g., U.S Pat. Nos. 3,393,150, 3,666,664, 3,707,502, 3,889,215 and 4,067,816, all of which are incorporated herein by reference. The combined detergent builders will make up from about 10% to about 50% by weight of the detergent composition, preferably about 20% to 40% by weight. In addition to the essential detersive surfactants and detergent additives, a detergent composition of the invention may include such conventional ingredients as lather boosters (e.g., alkanolamides), fillers, antiredeposition agents, fluorescers, pigments, germicides, scents and enzymes.

A detergent composition according to the invention can be prepared by any conventional manufacturing technique used for preparing detergent compositions, such as a slurry making and spraying-drying, and the detergent can take any one of the common physical forms associated with detergents, such as powders, flakes, granules, noodles, cakes, bars and liquids.

The relative positions of the carboxy groups and the hydroxamic acid groups, and the overall structure of the final bifunctional polymer, will be determined by the reaction conditions, including the amount and nature of the hydroxylamine compound employed. However, because the anhydride ring can be cleaved at two different points, the relative positions of carboxy and hydroxamic acid groups along the hydrocarbon polymer chain will be essentially random. The randomly alternating structure of such polymers may enhance their metal chelating effectiveness by providing different spacings between functional chelating groups, which, in turn, allows the polymer to sequester a wider variety of cations.

The invention is further illustrated by the following examples, which should not be contrued as limiting the scope of the invention.

EXAMPLE 1

Preparation of Polyacrylic Anhydride

Polyacrylic acid (Aldrich; molec. wt.=2,000) was obtained as a 65% solution in water. This was diluted to about a 20% solution, then freeze-dried to give a white solid. A mixture of 50 g of solid polyacrylic acid and 180 ml of acetyl chloride was refluxed gently for 24 hours. By product acetic acid and excess acetyl chloride were removed by vacuum distillation at a bath temperature of 100°–120° C. to give an oily residue which was cooled and then crystallized by stirring with 250 ml of diethyl ether.

The resulting tan solid was filtered, washed with diethyl ether, and vacuum dried for 48 hours to give 48.3 g of polyanhydride. Infrared analysis indicated very little residual carboxylic acid.

EXAMPLE 2

Preparation of Hydroxylamine Derivative 27.8 g of hydroxylamine hydrochloride (0.40 mole) and 32.8 g of sodium acetate (0.40 mole) were mixed in 75 ml of water and stirred until a clear solution was obtained. 25.2 g (0.20 mole) of solid polyacrylic anhydride were added to the clear hydroxylamine solution and stirred overnight. The resulting clear orange solution was poured into 450 ml of methanol and stirred in a blender.

The solid product was filtered, washed with methanol, vacuum-dried, then redissolved in 75ml of water and neutralized to pH 8 with 40% NaOH. This isolation procedure was repeated, and 18.1 g of hydroxamated polyacrylic anhydride were obtained.

NMR analysis of a film cast from a pH 3 solution indicated about 50% carboxyl groups, 46% hydroxamic acid groups, and about 4% imide groups.

EXAMPLE 3

N-Methylhydroxylamine Derivative

A solution of 24.0 g of 87% KOH (0.373 mole) in 200 mg of methanol was stirred while adding 32.8 g (0.393 mole) of N-methylhydroxlamine hydrochloride. After 10 minutes, the solution was placed in water bath and 45.0 g of solid polyacrylic anhydride were added in portions. The mixture was stirred for 4 hours and filtered to remove precipitated KCl.

The filtrate was evaporated to an oil, which was dissolved in 65 ml of water. The aqueous solution was adjusted to pH 9 by slow addition of 40% NaOH with stirring and cooling. The solution was then poured into 400 mg of acetone while stirring. The resulting insoluble oil was washed with fresh acetone and vacuum-dried to give 60.5 g of a pale yellow solid product.

NMR analysis showed approximately 60% carboxy groups and 40% —CON(CH$_3$)OH groups.

EXAMPLE 4

Tea Stain Removal Test

The performance of polymeric carboxy hydroxamic acid builders of Examples 2 and 3 as fabric-washing detergent additives was examined in a tea stain removal test:

Swatches of white cotton cloth were boiled in very strong tea (10 bags/1 liter deionized water, brewed 10 min.) for 15 minutes. The tea solution and swatches were removed from the heat and cooled to 115° F. with continued stirring. The swatches were thereafter wrung and air dried between paper towels.

Deionized water was heated to 40° C. and 100 g of $CaCl_2$ were added per each liter of water, followed by 1.5 g per liter of water of a commercial fabric-washing detergent (Tide ®; Procter & Gamble).

To 1-liter aliquots of this detergent solution were added 100 mg of the detergent additives to be tested, which were stirred until dissolved. The wash solutions were maintained at about 35° C. and a stirring speed of 100 rpm. The pH was adjusted to 10 if necessary with sulfuric acid or sodium hydroxide. Tea stained swatches of cloth were added to each test solution and stirred rapidly for 10 minutes, after which the solution was poured off and the swatches were squeezed out and rinsed for 2 minutes in deionized water containing the same proportion of $CaCl_2$. The swatches were air dried overnight and compared against a control and a commercial detergent additive.

The samples tested and the results recorded are set forth below:

| Sample No. | Additive | Stain Appearance After Washing |
|---|---|---|
| control | — | darkest |
| comparison | Dequest ®2041 (Monsanto) | lightest |
| 1 | $H_2NOH$ derivative | medium |
| 2 | $CH_3NHOH$ derivative | medium |

It will be understood that the foregoing description of the invention is susceptible to modifications, changes and adaptations, all of which are intended to be comprehended within the meaning and range of equivalents of the appended claims. For instance, though the foregoing description is directed to the use of the carboxy hydroxamic acid polymers in detergent systems, they will also find application in boiler water systems and other scale prevention uses, polymerization intermediates, and other embodiments where strong metal ion chelation is required.

I claim:

1. A method for the production of polyacrylic anhydride comprising reacting polyacrylic acid with an acyl compound of the formula R'C:OX, wherein R' represents an organic radical of 1 to 12 carbon atoms selected from the group consisting of straight or branched chain alkyl, aryl, alkaryl, aralkyl, or alkenyl radicals and X represents a halogen or an organic anhydride residue having the formula R'C:OO−, wherein R' is as defined above, said reaction being conducted in the absence of a catalyst.

2. A method according to claim 1, wherein said acyl compound is selected from the group consisting of ethanoyl chloride, propanoyl chloride, butanoyl chloride, 2-methyl propanoyl chloride, benzoyl chloride, the bromide and fluoride acid halides corresponding to such compounds, ethanoic anhydride, propanoic anhydride, benzoic anhydride and phthalic anhydride.

3. A method according to claim 2, wherein about 2 to 10 moles of the acyl compound per mole of the polyacrylic acid is used.

4. A process for preparing polymeric carboxyl hydroxamic acids comprising
    (a) reacting polyacrylic acid with a compound of the formula R' represents an organic radical of 1 to 12 carbon atoms selected from the group consisting of straight for branched claim alkyl, aryl, alkaryl, aralkyl or alkenyl radicals and X represents a halogen atom or an organic anhydride residue having the formula R'C:OO−, wherein R' is as defined above, wherein said reaction being conducted in the absence of a catalyst and
    (b) reacting the resultant polymeric anhydride with a hydroxylamine compound of the formula HRNOH, wherein R represents hydrogen or $C-C_6$ alkyl, cycloalkyl, or phenyl group.

5. A process according to claim 4, wherein said acyl compound is selected from the group consisting of ethanoyl chloride, propanoyl chloride, butanoyl chloride, 2-methyl propanoyl chloride, benzoyl chloride, the bromide and fluoride acid halides corresponding to such compounds, ethanoic anhydride, propanoic anhydride, benzoic anhydride and phthalic anhydride.

6. A process according to claim 5, wherein about 2 to 10 moles of the acyl compound per mole of the polyacrylic acid is used.

7. A process according to claim 4, wherein said hydroxylamine compound is hydroxylamine hydrochloride or N-methylhydroxylamine.

8. A process according to claim 4, wherein the reaction with a hydroxylamine compound is carried out in the presence of an organic base selected from the group consisting of sodium acetate, sodium ethoxide, pyridine, triethylamine, and quinoline.

9. A detergent composition with transition metal ion chelating activity comprising one or more detersive surfactants, and about 3% to about 12% by weight of the total composition of a polmer having randomly alternating repeating units consisting essentially of those the formulae

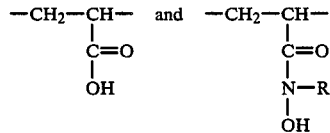

wherein R represents hydrogen or $C_1$–$C_6$ alkyl, cycloalkyl or a phenyl group.

* * * * *